US005747573A

United States Patent [19]
Ryan

[11] Patent Number: 5,747,573
[45] Date of Patent: May 5, 1998

[54] HIGH HEAT RESISTANT HOT MELT ADHESIVE

[75] Inventor: Lisa L. Ryan, Dayton, Minn.

[73] Assignee: H. B. Fuller Licensing & Financing, Inc., St. Paul, Minn.

[21] Appl. No.: 558,354

[22] Filed: Nov. 16, 1995

Related U.S. Application Data

[63] Continuation of Ser. No. 192,708, Feb. 7, 1994, abandoned.

[51] Int. Cl.$^6$ ............................................. C08K 5/09
[52] U.S. Cl. ................... 524/270; 524/292; 524/293
[58] Field of Search .................................. 524/270, 292, 524/293

[56] References Cited

U.S. PATENT DOCUMENTS

| | | | |
|---|---|---|---|
| 3,993,613 | 11/1976 | Doss et al. | 260/27 R |
| 4,702,496 | 10/1987 | Hume, III | 281/15 R |
| 4,956,207 | 9/1990 | Kauffman et al. | 428/34.2 |
| 5,143,961 | 9/1992 | Scholl et al. | 524/317 |
| 5,169,889 | 12/1992 | Kauffman et al. | 524/270 |
| 5,252,646 | 10/1993 | Iovine et al. | 524/270 |
| 5,256,717 | 10/1993 | Stauffer et al. | 524/293 |
| 5,257,491 | 11/1993 | Rouyer et al. | 53/428 |
| 5,401,792 | 3/1995 | Babu et al. | 524/270 |
| 5,454,909 | 10/1995 | Morganelli | 162/55 |

*Primary Examiner*—Helen Lee
*Attorney, Agent, or Firm*—Carolyn A. Fischer; Lisa L. Ryan; Nancy N. Quan

[57] ABSTRACT

A high heat resistant hot melt adhesive composition, its method of manufacture and its use on plastic and metallized foil containers, structures and the like is described herein, which adhesive contains a blend of an amorphous polyalphaolefin polymer, a solid benzoate plasticizer and a hydrocarbon tackifier where the elevated peel value of the resulting adhesive composition is greater than 160° F.

18 Claims, No Drawings

HIGH HEAT RESISTANT HOT MELT ADHESIVE

This is a continuation of application Ser. No. 08/192,708, filed Feb. 7, 1994, now abandoned.

FIELD OF THE INVENTION

The invention relates to a high heat resistant hot melt adhesive composition comprising a blend of amorphous polyalphaolefins, a solid benzoate plasticizer and a hydrocarbon tackifying resin. The resulting adhesive has a high heat resistance without sacrificing its cold temperature resistant properties. The products, in addition, have excellent specific adhesion to substrates that are otherwise difficult to bond such as plastics or metallized containers.

BACKGROUND OF THE INVENTION

Standard hot melt adhesives such as ethylene vinyl acetate base products or rubber base products do not have as high heat resistance. Their respective elevated peel values are not usually higher than 140° F. Hot melt adhesives containing isotactic thermoplastic polybutylene copolymer or a low density ethylene polymer with a solid plasticizer and tackifiers have been described in U.S. Pat. Nos. 4,956,207 and 5,256,717. Neither of these hot melt adhesives exhibit the high heat resistance of the present hot melt adhesives.

While amorphous polyalphaolefin based products are commonly used in the industry, it is well known that they generally have very poor heat resistance, low elevated peel and low shear values. Amorphous polyalphaolefin products are known to be useful for their flexibility and long open times, but often cannot be used because of their poor heat resistance. The present invention employs these polymers in combination with a solid benzoate plasticizer and a tackifier to provide surprisingly high heat resistance, for example, exhibiting elevated peel values greater than 170° F. Thus, the adhesives of the present invention have filled the void which has otherwise been left open by the standard hot melt adhesives. Packaging, engineered systems, wood working, structural, and the like are but a few areas where the present hot melt adhesive can fill this void.

SUMMARY OF THE INVENTION

Accordingly, the present invention is directed to a high heat resistance adhesive composition which is extrudable and adapted for bonding substrates which have been difficult to bond prior to the present adhesive, said adhesive composition comprising an amorphous polyalphaolefin polymer, a solid benzoate plasticizer of the formula:

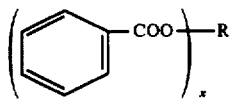

wherein x is an integer of 2 to 8 and R is an organic radical, and a tackifier. Said adhesive has elevated peel values of greater than 160° F.

DETAILED DESCRIPTION
AMORPHOUS POLYALPHAOLEFIN POLYMER

Amorphous polyalphaolefins can be manufactured tailor made by varying the conditions of preparation and the amount or type of monomer used. A group of preferred polyalphaolefins of various grades is available from Hüls America Inc., Piscataway, N.J. having a tradename Vestoplast®. Many different grades of Vestoplast® are available whose major raw materials are ethylene, propylene and butene-1. Other olefins, for example, hexene-1, can also be used. These monomers are copolymerized at low pressure in the presence of Ziegler-Natta catalysts.

The versatility of the process affords products with special sets of properties. Variations of process parameters like temperature, choice of catalyst and monomer feed result in products which have well defined softening point, temperature of embrittlement, melt viscosity, crystallinity/open time and hardness. Although homo and copolymers of amorphous polyalphaolefins can be used in present invention, the preferred embodiments employ terpolymers. The terpolymers may contain either high butene content or high propene content. Molecular weights of the polymers may vary anywhere from 30,000 to 70,000. Preferred terpolymers are those having a high propylene content whose molecular weight ranges from 45,000 to 60,000. The most preferred polymer used for the present adhesive composition has been that defined as Vestoplast® 828 having a molecular weight of approximately 60,000 and a melt-viscosity at 190° C. of 28,000, a softening point, ring and ball at 155° C. and an "intrinsic viscosity" (100 ml/g) of 0.70.

SOLID PLASTICIZERS

The solid benzoate plasticizers are generally derived from benzoic acid and selected alcohols and can be represented by the following formula:

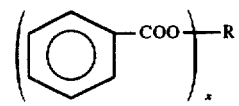

where R is an organic radical and x is 2 to 8 and preferably 2 to 4.

The benzoate plasticizers of the type described above are compatible with the amorphous polyalphaolefin adhesive composition and most importantly help to increase the open time while maintaining high crystallinity, necessary characteristics for the cohesively weak temporary adhesive product desired. These solid benzoates can be prepared from benzoic acid and suitable alcohols such as 1,4-cyclohexane dimethanol, neopentyl glycol, glycerol, pentaerythritol and sucrose. In the benzoate plasticizers, R is an organic radical which is derived from the alcohols used and more particularly will have up to about 12 carbon atoms or more. This organic radical may, for example, be an alkyl, cycloalkyl, aryl, aralkyl, alkenyl or aralkenyl group. Particularly useful benzoate compounds in this invention are those wherein x is 2 to 4 including 1,4-cyclohexane dimethanol dibenzoate, neopentyl glycol dibenzoate, glycerol tribenzoate and pentaerythritol terbenzoate. Compounds of this type are available from Velsicol Chemical Corporation under the name Benzoflex. Most preferred solid benzoic plasticizer of the present invention is the 1,4-cyclohexane dimethanol benzoate.

TACKIFYING RESIN

The tackifying resins which may be used to extend the adhesive properties of the amorphous polyalphaolefins include: (1) hydrogenated wood rosin or rosin ester; (2) polyterpene resins having a softening point, as determined by an ASTM method E28-58 T, of from about 80° C.–150° C., the latter polyterpene resins generally resulting from the polymerization of terpene hydrocarbons in the presence of Friedel-Crafts catalysts at moderately low temperatures and including the latter resins which are aromatically modified; examples of commercially available resins of this type being the Nirez resins sold by Reichhold Chemical, the Zonatac resins sold by Arizona, and the Piccolyte S-85, S-100, S-115, S-125 and S-135 resins as sold by Hercules Chemical; (3) aliphatic petroleum hydrocarbon resins having a Ball and Ring softening point of from about 80°–160° C., resulting from polymerization of monomers consisting primarily of 5 carbon atom olefins and diolefins, and including the latter resins which are aromatically modified, examples of commercially available resins of this type being Wingtack 95 and Wingtack Extra as sold by the Goodyear Tire and Rubber Company and the Escorez 1000 series of resins sold by the Exxon Chemical Corporation; and (4) partially and fully hydrogenated hydrocarbon resins such as Eastotac H-130 and Eastotac H-100 from Eastman, Escorez 5000 series from Exxon, and Regalrez from Hercules. The more preferred are the hydrocarbon resins, for example, the Escorez 5000 series or Eastotac H-100 mentioned above.

In addition to the main components, the hot melt adhesive composition may further comprise an antioxidant. Among the applicable antioxidants include high molecular weight hindered phenols and multifunctional phenols. Examples of such include: 1,3,5-trimethyl-2,4,6-tris-(3,5di-tert-butyl-4-hydroxybenzyl)benzene; pentaerythritol tetrakis-3-(3,5-di-tert-butyl-4-hydroxphenyl)propionate; 4,4'methylene-bis-(2,6-tert-butylphenol); 4,4'-thio-bis-(6-tert-butyl-o-cresol); 2,6-di-tertbutylphenol; 6-(4-hydroxyphenoxy)-2,4-bis(n-octylthio)-1,3,5-triazine; di-n-octadecyl-3,5-di-tertbutyl-4-hydroxy-benzylphosphonate; 2-(n-octylthio)ethyl-3,5-di-tert-butyl-4-hydroxybenzoate; hexa[3-(3,5-di-tert-butyl-4-hydroxyphenyl)propionate); 3,3-(thio-bis-propanoic acid di-dodecylester), and the 2,2-bis-3-3,5-bis(1,1-dimethylethyl)-4-hydroxyphenyl-1-oxypropoxymethyl-1,3-propanediyl ester of 3,5-bis(1,1-dimethylethyl)-4-hydroxybenzenepropanoic acid.

The hot melt adhesive may also contain a liquid plasticizer. These liquid plasticizers are those known to anyone skilled in the art and include but are not limited to oils, liquid dibenzoate such as dipropyleneglycol dibenzoate or diethyleneglycol dibenzoate, polybutylene and the like. One of the preferred liquid plasticizers used in the present invention is polybutylene.

The adhesive compositions of the invention can also contain other additives such as fillers, pigments, dyes and other ingredients which are conventionally added to hot melt adhesives for various property enhancements. These are incorporated in minor mounts into the formulations of the present invention.

An alternate and preferred embodiment of the present invention is a high resistant hot melt adhesive composition comprising:

a) about 20–80 parts by weight of an amorphous polyalphaolefin polymer, b) about 5–40 parts by weight of a solid benzoate plasticizer of the formula

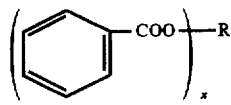

wherein x is an integer of 2 to 8 and R is an organic radical, and c) about 10–70 parts by weight of a tackifier, wherein said adhesive composition has an elevated peel value of greater than 160° F.

Still another preferred embodiment is a high heat resistant hot melt adhesive composition comprising:

a) about 40 to 60 parts by weight of an amorphous polyalphaolefin terpolymer, b) about 5 to 20 parts by weight of 1,4-cyclohexane dimethanol dibenzoate, and c) about 20 to 40 parts by weight of a hydrocarbon resin, wherein said adhesive composition has an elevated peel value of greater than 170° F.

The following table summarizes useful, preferred and most preferred proportions of the major components of the present invention. The numerical figures are in parts by weight.

TABLE

|  | Useful | Preferred | Most Preferred |
| --- | --- | --- | --- |
| APAO* | 20–80 | 30–70 | 40–60 |
| Solid Benzoate Plasticizer | 5–40 | 5–30 | 5–20 |
| Tackifier | 10–70 | 10–50 | 20–40 |
| Liquid Plasticizer | 0–30 | 0–20 | 0–10 |
| Antioxidant | 0–5 | 0–2 | 0–1 |

*Amorphous polyalphaolefin

The adhesive compositions are prepared by blending the components in the melt at a temperature of about 130°–200° C. until a homogeneous blend is obtained. Various methods of blending are known in the art and any method that produces a homogeneous blend is satisfactory.

The adhesive blends are extruded into individual pillows and packaged by coating the individual pillows to prevent each adhesive piece from sticking to each other. These coatings are coextrusion coatings made of a homopolymer, for example, an ethene homopolymer coating.

The resulting adhesives are characterized by their high heat resistance and unexpectedly high elevated peel values which are much greater than 160° F. They are, therefore, especially useful for structural applications, engineered systems, and in the packaging industry in sealing plastic packages, containers and metallized packages, films, foils and the like.

The following examples are illustrative of the embodiments of this invention. Unless otherwise noted, the amounts of materials are in percent or parts by weight.

EXAMPLE 1

The following blend is an illustration of an adhesive composition of the present invention:

(100 g) 50% Vestoplast 828, the APAO (20 g) 10% Parapol, 1300, polybutylene (59 g) 29.5% Eastotac H-100, hydrocarbon resin tackifier, made up of C6 to C20 hydrogenated hydrocarbons (20 g) 10.0% Benzoflex 352, 1,4-cyclohexane dimethanol, dibenzoate (0.6 g) 0.3% Irganox 1010, 2,2-bis-3-3,5-bis(1,1-dimethylethyl)-4-hydroxyphenyl-1-oxoproxymethyl-1,3-propane-diyl ester of 3,5-bis(1,1-dimethylethyl)-4-hydroxybenzene propanoic acid (0.4 g) 0.2% Cyanox (LTDP), an antioxidant didodecylester of 3,3-(thio-bis-propanoic acid).

The above adhesive had the following properties:

| Programmed 100 gram oven peel | 193 | Degrees F |
| --- | --- | --- |
| Programmed Oven Shear | 210 | Degrees F |
| Viscosity @ 325F | 7,190 | cP (mPa.s) |
| Viscosity @ 350F | 4,900 | cP (mPa.s) |
| Viscosity @ 375F | 3,235 | cP (mPa.s) |

| | | |
|---|---|---|
| Viscosity @ 400F | 2,375 | cP (mPa.s) |
| Shelf Life | One Year | |
| Form & Packaging | Pillow | |
| Recommended Application Temperature | 350,375 | Degrees F |

EXAMPLE 2

The following adhesive composition is blended without the presence of a liquid plasticizer:

57.5% Vestoplast 828
20.0% Eastotac H-100
20.0% Benzoflex 352
0.2% Cyanox LTDP
0.3% Irganox 1010
2.0% Coextrusion Coating The above adhesive has a peel value of 186° F., a shear value of 216° F. and a viscosity of 7,000 cP(mPa.s) at 350° F.

These melt adhesives are especially desirable for use in film and foil laminating as well as frozen food packaging.

EXAMPLE 3

This formulation was carried out without the presence of the solid benzoate plasticizer, Benzoflex 352. The blend contained the following ingredients:

(33 g) 11% Parapol 1300
(163.5 g) 54.5% Vestoplast 828
(96 g) 32% Eastotac H-100R
(0.9 g) 0.3% Irganox 1010
(0.6 g) 0.2% Cyanox LTDP The resulting adhesive composition had a much lower elevated peel value which was 114° F.

EXAMPLE 4

The following adhesive replaced Benzoflex 352 with a wax. The following ingredients were blended together to form an adhesive composition:

(30 g) 10% Parapol 1300
(147 g) 49% Vestoplast 828
(85.5 g) 28.5% Eastotac H-100R
(30 g) 10.0% Polywax C-4040
(0.9 g) 0.3% Irganox 1010
(0.6 g) 0.2% Cyanox LTDP Antioxidant This adhesive had an elevated peel value of 115° F.

The viscosity, peel and shear values for the compositions of Examples 1–4 were determined by the following standard methods known in the art.

DETERMINING A HOT MELT VISCOSITY USING A BROOKFIELD THERMOSEL

Summary of Method:

A measured amount of sample is melted in a Thermosel Viscometer, the spindle is immersed and the viscosity measured after the temperature has equilibrated.

Material and Equipment:

1. Brookfield Thermosel—Available from Brookfield Labs, 240 Cushing Street, Stoughton, Mass. 02072, phone: (617) 344-4310

2. Spindles SC4-21, SC4-27, SC4-29

3. Brookfield Viscometer (preferably Model RVT)
4. Balance accurate to +/–0.25 gr.

Sample Preparation:

1. The wire spindle should be used for samples less than 50,0000 cps and the solid spindle for samples greater than 50,000 cps at the specified temperature.

2. Weigh the amount of the test sample which in the liquid state will be equivalent to the test sample volume required. Example:

| Spindle | Sample Volume (cc) | | Specific Gravity of Test Sample | | Test Sample Volume Required (g) |
|---|---|---|---|---|---|
| RVT SC4-21 | 8.0 | × | | = | |
| RVT SC4-27 | 10.5 | × | | = | |
| RVT SC4-29 | 13.0 | × | | = | |

As shown above, the test sample volume required is calculated by the sample volume of a specific spindle multiplied by the specific gravity of the test sample.

Procedure:

1. Calibrate Thermosel Viscometer according to HMT-56.
2. Preheat the Thermosel to the desired temperature.
3. Attach the specified spindle.
4. Weigh the amount of hot melt specified for each spindle and place in the Thermosel chamber.
5. As soon as possible, immerse the spindle in the melted hot melt.
6. Starting at 0.5 rpm, turn on the viscometer. Progressively, turn up the rpm's until the specified speed is reached. (Be careful not to cause the chart recorder to go off scale.)

When setting the viscosity specification in product development, the most reproducible viscosities will fall between 60 and 80 on the chart recorder.

7. The viscosity is taken 30 minutes after the spindle has been completely immersed.

The viscosity is reported in centipoise noting the temperature, spindle and RPM's.

MEASURING KRAFT TO KRAFT HEAT RESISTANCE OF HOT MELTS

Kraft paper is laminated to form a one inch by one inch bond area. Weights are attached in the peel and shear modes and the samples are placed in an oven. The oven is programmed to increase at a certain rate of temperature. The temperature at which the bond delaminates is recorded.

Material and Equipment:

1. Programmable oven, capable of a 25 Deg. C. per hour increase from 25 Deg. C. to 150 Deg. C.
2. 18 pound basis weight kraft paper.
3. 100 gram and 500 gram weights.
4. Device for monitoring oven temperatures.
5. Device for supporting samples in the oven.
6. Release paper.
7. Two glass rods, each one half inch in diameter and eight inches long. One glass rod should have a ten mil shim at each end. The shims should be positioned so that they ride on the release paper (see below).

Sample Preparation:
Procedure:

1. Cut two sheets of kraft paper, each six inches by twelve inches.

2. Cut two pieces of release paper, each two inches by twelve inches.

3. Tape on one piece of kraft paper to a heat insulator, such as a tablet back, heavy chip board, etc.

4. Tape the two pieces of release paper to the kraft lengthwise, in the center, exactly one inch apart.

5. Lay the second piece of kraft paper on top of the release paper so it entirely covers the first piece of kraft paper. Tape one end only of the second piece of kraft, to the composite.

6. Fold back the second piece of kraft and place the shimmed glass rod on the tape "hinge".

7. Place the unshimmed glass rod below the second sheet of kraft paper, as close to the tape "hinge" as possible. (The second piece of kraft is now between the two glass rods. The shimmed rod is on top, in view. The unshimmed rod is partially concealed by the second piece of kraft because it is folded back.)

8. Pour a puddle of hot melt at its normal application temperature (i.e. 350 Dec. F.) onto the first piece of kraft near the top and between the release paper.

9. Quickly push both glass rods across the bottom sheet of kraft paper. (The shimmed glass rod will draw the hot melt into the film and the second rod will pull the second piece of kraft paper over the first to form a bond.)

10. Trim the "sandwich" widthwise into six pieces, each only one inch by four.

11. Let strips condition at room temperature for 16 hours minimum.

Testing:

1. Suspend the six samples from one "tail" in the oven using the tail with the adhesive beyond the one inch square.

2. Attach a one hundred gram weight to a tail of each of three samples in peel mode.

3. Attach a five hundred gram weight to the tail of each of three samples in the shear mode.

4. Start the oven at 25 Deg. C. and increase the temperature continuously at 25 Deg. C./hour.

5. Observe the samples and note the temperature at which the samples delaminate and the weight falls.

The peel and shear values are reported as the average temperature at which the three peel and three shear samples fail.

What is claimed is:

1. A high heat resistant hot melt adhesive composition comprising:
   a) about 20–80 parts by weight of the adhesive of an amorphous polyalphaolefin butene-propylene-ethylene terpolymer;
   b) about 5–40 parts by weight of the adhesive if a solid benzoate plasticizer; and
   c) about 10–70 parts by weight of the adhesive of a tackifier, wherein said adhesive composition has an elevated peel value of greater than about 160° F.

2. The composition of claim 1, wherein the tackifier is a hydrocarbon resin.

3. The composition of claim 1, wherein the solid benzoate plasticizer is 1,4-cyclohexane dimethanol dibenzoate.

4. The composition of claim 1, wherein the amorphous polyalphaolefin is a butene-propylene-ethylene terpolymer.

5. The composition of claim 1, which further comprises a liquid plasticizer.

6. The composition of claim 1, which further comprises an antioxidant.

7. The composition of claim 1 wherein the amorphous polyalphaolefin is present in about 30–70 parts by weight of the adhesive.

8. The composition of claim 1 wherein the solid benzoate plasticizer is present in about 5–30 parts by weight of the adhesive.

9. The composition of claim 1, wherein the solid benzoate plasticizer is 1,4-cyclohexane dimethanol dibenzoate.

10. The composition of claim 1 wherein the tackifier is present in about 10–50 parts by weight of the adhesive.

11. The composition of claim 1, wherein the tackifier is a hydrocarbon resin.

12. The composition of claim 1 further comprises up to about 30 parts by weight of the adhesive of a liquid plasticizer.

13. The composition of claim 1 which further comprises up to about 2 parts by weight of the adhesive of an antioxidant.

14. A high heat resistant hot melt adhesive composition comprising:
   a) about 40 to 60 parts by weight of the adhesive of an amorphous polyalphaolefin butene-propylene-ethylene terpolymer;
   b) about 5 to 20 parts by weight of the adhesive of 1,4-cyclohexane dimethanol dibenzoate; and
   c) about 20 to 40 parts by weight of the adhesive of a hydrocarbon resin, wherein said adhesive composition has an elevated peel value of greater than about 160° F.

15. The composition of claim 14, wherein the amorphous polyalphaolefin is a terpolymer of butene-propylene-ethylene with a high concentration of propylene.

16. The composition of claim 14 which further comprises up to about 20 parts by weight of the adhesive of a liquid plasticizer.

17. The composition of claim 14 which further comprises up to about 2 parts by weight of the adhesive of an antioxidant.

18. The composition of claim 14, which further comprises up to 1 part by weight of an antioxidant.

* * * * *

UNITED STATES PATENT AND TRADEMARK OFFICE
CERTIFICATE OF CORRECTION

PATENT NO. : 5,747,573
DATED : May 5, 1998
INVENTOR(S) : Lisa L. Ryan

It is certified that error appears in the above-identified patent and that said Letters Patent is hereby corrected as shown below:

Column 4, Example 1, change polybutylene to polybutene.

Signed and Sealed this

Tenth Day of November 1998

Attest:

BRUCE LEHMAN

Attesting Officer      Commissioner of Patents and Trademarks